(12) United States Patent
Nagendra et al.

(10) Patent No.: US 11,113,142 B2
(45) Date of Patent: Sep. 7, 2021

(54) EARLY RISK DETECTION AND MANAGEMENT IN A SOFTWARE-DEFINED DATA CENTER

(71) Applicant: VMWARE, INC., Palo Alto, CA (US)

(72) Inventors: Nagashree Nagendra, Bangalore (IN); Tejasvi Ravi, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 171 days.

(21) Appl. No.: 16/139,103

(22) Filed: Sep. 24, 2018

(65) Prior Publication Data

US 2020/0034224 A1  Jan. 30, 2020

(30) Foreign Application Priority Data

Jul. 25, 2018  (IN) .............................. 201841027955

(51) Int. Cl.
    *G06F 11/00*  (2006.01)
    *G06F 11/07*  (2006.01)
(52) U.S. Cl.
    CPC ........ *G06F 11/0793* (2013.01); *G06F 11/004* (2013.01); *G06F 11/0754* (2013.01); *G06F 11/0772* (2013.01); *G06F 2201/81* (2013.01)
(58) Field of Classification Search
    CPC ............ G06F 11/0754; G06F 11/0757; G06F 2201/81; G06F 11/076; G06F 11/30; G06F 11/3409; G05B 23/0283
    USPC ...................................................... 714/1–57
    See application file for complete search history.

(56) References Cited

U.S. PATENT DOCUMENTS

| 6,678,639 | B2 | 1/2004 | Little et al. |
| 9,467,464 | B2 | 10/2016 | Gula et al. |
| 2008/0235776 | A1* | 9/2008 | Nakatomi ............. G06F 21/608 726/7 |
| 2009/0164853 | A1* | 6/2009 | Gokhale ............. G06F 11/0793 714/57 |
| 2012/0011590 | A1 | 1/2012 | Donovan et al. |
| 2013/0326623 | A1* | 12/2013 | Kruglick ............... G06F 21/577 726/23 |
| 2015/0012782 | A1* | 1/2015 | Olgiati .................... G06F 30/34 714/47.1 |
| 2015/0134799 | A1* | 5/2015 | Clark .................... H04L 47/127 709/223 |
| 2016/0253229 | A1* | 9/2016 | Sade ....................... H04L 41/06 714/37 |
| 2016/0378409 | A1* | 12/2016 | Muramatsu ........... G06F 3/1238 358/1.14 |
| 2016/0378583 | A1* | 12/2016 | Nakano ................... G06F 11/34 714/37 |
| 2017/0075932 | A1* | 3/2017 | Wang .................. G06F 16/2379 |

(Continued)

*Primary Examiner* — Sarai E Butler

(57) ABSTRACT

The present disclosure is related to devices, systems, and methods for early risk detection and management in a software-defined data center. An example device can include instructions to receive a historical log bundle associated with a log source of a software-defined data center (SDDC), parse the historical log bundle to determine an association rule, wherein the association rule relates a particular risk to the SDDC to a sequence of operations in the log bundle, monitor a log associated with the log source, determine a potential risk based on an occurrence of the sequence of operations in the log, and provide a notification responsive to a determination that a probability associated with the potential risk exceeds a probability threshold.

20 Claims, 5 Drawing Sheets

(56) References Cited

U.S. PATENT DOCUMENTS

2017/0099365 A1\* 4/2017 Jain .................. H04L 67/327
2018/0077190 A1\* 3/2018 Mowry ............... G06F 16/248
2018/0191760 A1\* 7/2018 Kumar ................ H04L 67/18
2018/0218303 A1\* 8/2018 Cole ................ G06K 9/00335

\* cited by examiner

EARLY RISK DETECTION AND MANAGEMENT IN A SOFTWARE-DEFINED DATA CENTER

RELATED APPLICATIONS

Benefit is claimed under 35 U.S.C. 119(a)-(d) to Foreign Application Serial No. 201841027955 filed in India entitled "EARLY RISK DETECTION AND MANAGEMENT IN A SOFTWARE-DEFINED DATA CENTER", on Jul. 25, 2018, by VMware, Inc., which is herein incorporated in its entirety by reference for all purposes.

BACKGROUND

In a software-defined data center (SDDC), operations and/or sequences of operations can cause critical failures resulting in losses of critical systems (e.g., business critical systems (BCS) and/or mission critical systems (MCS)). While some failures, such as those due to distributed denial-of-service (DDoS) attacks and/or loss of power, can disrupt service, other seemingly non-threatening operations can also be disruptive. Failures of an SDDC can include, for example, screen of death, all paths to the system down, permanent device loss, and system not responding.

Previous approaches to detecting and/or managing these risks may be unable to detect risk far enough in advance of a failure. As a result, even if a risk is detected, it may be too late to avoid a failure. Moreover, previous approaches may be unable to provide likely solution(s) to the impending risk(s).

DETAILED DESCRIPTION

Figure 1:
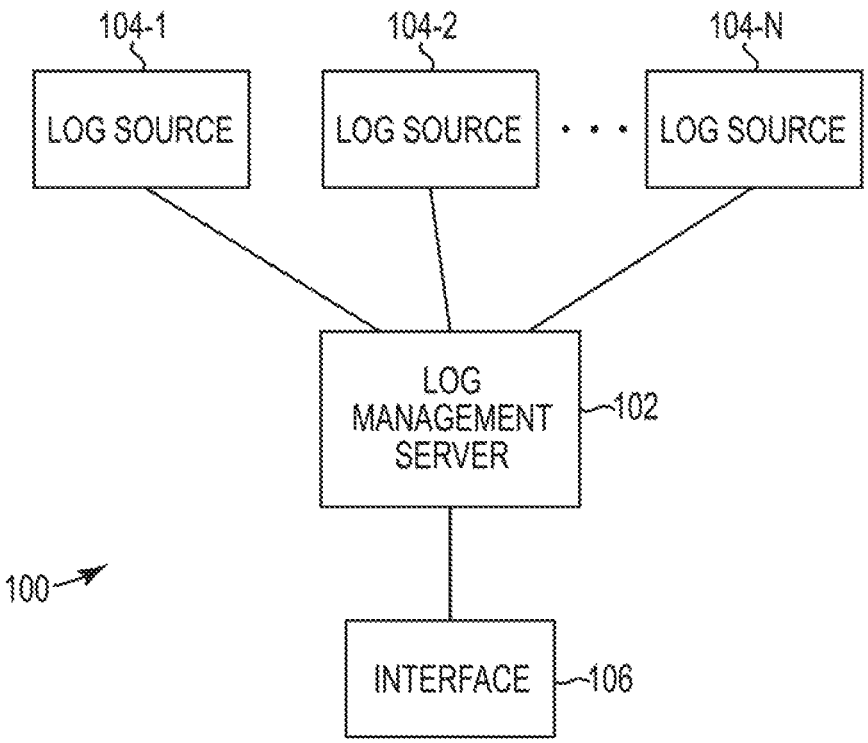
FIG. 1 is a general logical diagram of an infrastructure for early risk detection and management in an SDDC according to the present disclosure.

A connected environment or system, such as an SDDC, can include one or more log sources. As used herein a log source refers to a source of one or more logs (e.g., task logs and/or event logs). In general, a log source can refer to any entity capable of generating logs. For instance, a log source can be a server (e.g., a physical server), a virtual computing instance, a host, a network device, a desktop computing device, an event channel, a log aggregator, a log file, etc.

In an SDDC, administrators desire to be aware of any operation and/or sequence of operations that may cause critical failures resulting in the loss of business-critical systems (BCS) and/or mission critical systems (MCS). Embodiments of the present disclosure can provide an Early Risk Detection and Management System (ERDMS) that provides insights on the operations that can put the system in peril, recommends steps to reduce and/or eliminate the risks involved, and executes those steps.

In cloud environments, the set of operations executed will impact whether a system functions as expected or breaks down unexpectedly (e.g., fails). These operations are recorded in logs. A computing device in accordance with embodiments herein can continually monitor system parameters by processing the sequence of operations performed on the system (e.g., the logs) to detect potential risks and recommend the probable solutions. In some embodiments, the computing device parses a plurality of historical logs (herein referred to as one or more "log bundles") to learn rules (herein referred to as "association rules") for risk detection. Each of the association rules can be embodied as premise—sequence of operations and inference—potential risk(s). The computing device can then monitor a system (e.g., the logs of the system). If a pattern is detected, the pattern can be classified into a set of potential risks using a decision tree, for instance. Some embodiments can include determining a probability for each potential risk and generating a summary of the potential risk and/or the operations leading to it. In some embodiments, once a potential risk is detected, searching can be performed to recommend one or more probable solutions. In some embodiments, the steps of a solution can be automatically executed (e.g., without user input). Thus, in some cases, the potential issue and/or failure can be avoided altogether. Stated differently, embodiments of the present disclosure can determine a relationship between a set of operations and a resulting failure using association rule learning and use that determined relationship to detect risks associated with the failure and execute steps to reach a solution before the failure occurs.

As referred to herein, the term "log source" can sometimes refer to a virtual computing instance (VCI), which covers a range of computing functionality. VCIs may include non-virtualized physical hosts, virtual machines (VMs), and/or containers. A VM refers generally to an isolated end user space instance, which can be executed within a virtualized environment. Other technologies aside from hardware virtualization that can provide isolated end user space instances may also be referred to as VCIs. The term "VCI" covers these examples and combinations of different types of VCIs, among others. VMs, in some embodiments, operate with their own guest operating systems on a host using resources of the host virtualized by virtualization software (e.g., a hypervisor, virtual machine monitor, etc.).

Multiple VCIs can be configured to be in communication with each other in an SDDC. In such a system, information can be propagated from an end user to at least one of the VCIs in the system, between VCIs in the system, and/or between at least one of the VCIs in the system and a log management server. In some embodiments, the log management server can be provided as a VCI. SDDCs are dynamic in nature. For example, VCIs and/or various application services, may be created, used, moved, or destroyed within the SDDC. When VCIs are created, various processes and/or services start running and consuming resources. As used herein, "resources" are physical or virtual components that have a finite availability within a computer or SDDC. For example, resources include processing resources, memory resources, electrical power, and/or input/output resources.

The present disclosure is not limited to particular devices or methods, which may vary. The terminology used herein is for the purpose of describing particular embodiments, and is not intended to be limiting. As used herein, the singular forms "a", "an", and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to."

The figures herein follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1, and a similar element may be referenced as 202 in FIG. 2. A group or plurality of similar elements or components may generally be referred to herein with a single element number. For example, a plurality of reference elements 104-1, 104-2, . . . , 104-N may be referred to generally as 104. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

FIG. 1 is a general logical diagram of an infrastructure for early risk detection and management in an SDDC according to the present disclosure. For example, FIG. 1 can be a diagram of a system 100 for early risk detection and management in an SDDC according to the present disclosure. The system 100 can include a log management server 102 in communication with a number of log sources 104-1, 104-2, . . . , 104-N (referred to generally herein as "log sources 104"). The log sources 104 can provide a same functionality. For example, the log sources 104 can provide email functionality. In some embodiments, the log sources 104 are configured to selectively permit client login. In some embodiments, the log sources 104 are email log sources. In some embodiments, the log sources 104 are application log sources. In a number of embodiments, the log sources 104 can be servers, such as files servers, print servers, communication servers (such as email, remote access, firewall, etc.), application servers, database servers, web servers, open source servers, and others. Embodiments herein are not intended to limit the log sources 104 to a particular type and/or functionality.

The system 100 can include an interface 106. The interface 106 can be a computing device and/or display device, for instance. The interface 106 can refer to a user interface such that information from the log management server 102 is provided to a user (e.g., an administrator). The log management server 102 and the number of log sources 104 are described in greater detail below in the description associated with FIG. 2 (respectively referred to therein as "log management server 202" and "log sources 204").

The log sources 104 can each record a log of activities that occur thereon. Logs can be recorded in real time, for instance. In some embodiments, logs can detail log source interaction with a client, for instance. In some embodiments, logs can track aspects of a number of applications and/or programs. In some embodiments, logs can track physical and/or virtual hardware usage. The logs can be communicated from the log sources 104 to the log management server 102. In some embodiments, the logs can be received by the log management server 102 from the log sources 104. In some embodiments, the logs may be first communicated to a log aggregator and then communicated from the log aggregator to the log management server 102. The reception of logs by the log management server 102 is discussed in more detail below in connection with FIGS. 3, 4, and 5.

Figure 2:
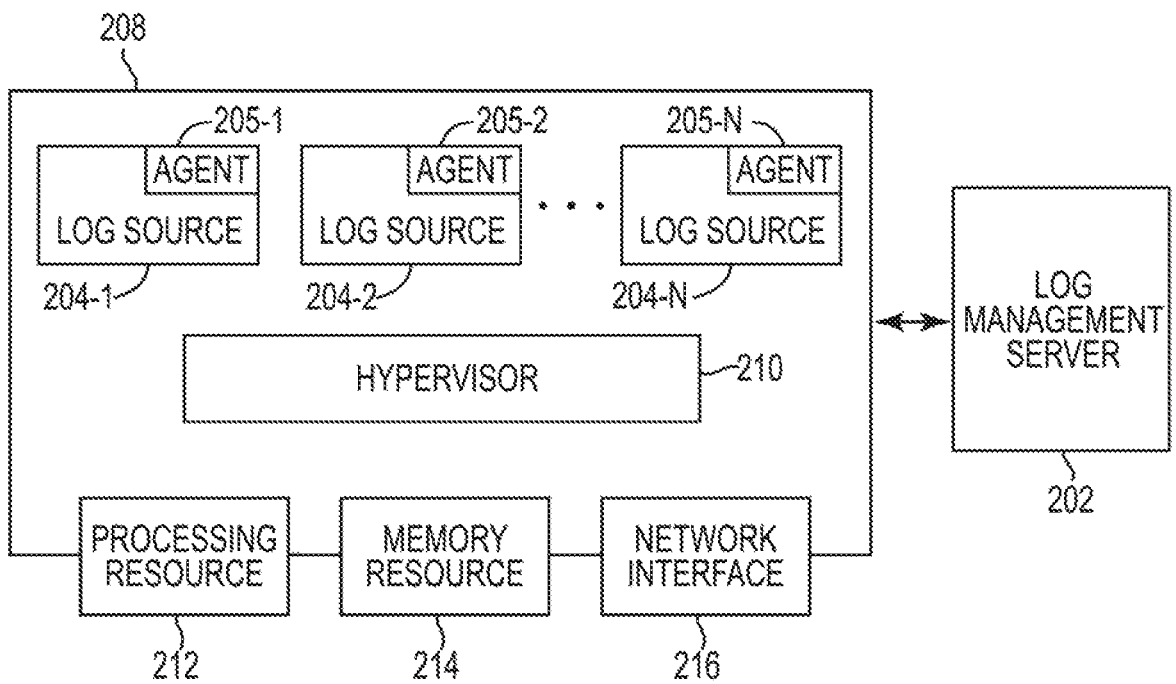
FIG. 2 is a diagram of an example of an infrastructure associated with early risk detection and management in an SDDC according to the present disclosure.

FIG. 2 is a diagram of an example of an infrastructure associated with early risk detection and management in an SDDC according to the present disclosure. For example, FIG. 2 can be a diagram of a host 208 for early risk detection and management in an SDDC according to the present disclosure. It is noted that embodiments of the present disclosure are not limited to the host 208 illustrated in FIG. 2; as previously discussed, early risk detection and management in an SDDC can be provided in other environments. The host 208 can include processing resources 212 (e.g., a number of processors), memory resources 214, and/or a network interface 216. Memory resources 214 can include volatile and/or non-volatile memory. Volatile memory can include memory that depends upon power to store information, such as various types of dynamic random-access memory (DRAM) among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory, optical memory, and/or a solid-state drive (SSD), etc., as well as other types of machine-readable media. For example, the memory resources 214 may comprise primary and/or secondary storage.

The host 208 can be included in an SDDC. An SDDC can extend virtualization concepts such as abstraction, pooling, and automation to data center resources and services to provide information technology as a service (ITaaS). In an SDDC, infrastructure, such as networking, processing, and security, can be virtualized and delivered as a service. An SDDC can include software defined networking and/or software defined storage. In some embodiments, components of an SDDC can be provisioned, operated, and/or managed through an application programming interface (API).

The host 208 can incorporate a hypervisor 210 that can execute a number of VCIs 204-1, 204-2, . . . , 204-N that can each provide the functionality of a log source, as previously discussed. As such, the VCIs may be referred to herein as "log sources." The log sources 204-1, 204-2, . . . , 204-N are referred to generally herein as "log sources 204." The log sources 204 can be provisioned with processing resources 212 and/or memory resources 214 and can communicate via the network interface 216. The processing resources 212 and the memory resources 214 provisioned to the log sources 204 can be local and/or remote to the host 208. For example, in an SDDC, the log sources 204 can be provisioned with resources that are generally available to the SDDC and are not tied to any particular hardware device. By way of example, the memory resources 214 can include volatile and/or non-volatile memory available to the log sources 204. The log sources 204 can be moved to different hosts (not specifically illustrated), such that different hypervisors manage the log sources 204. In some embodiments, a log source among the number of log sources can be a master log source. For example, log source 204-1 can be a master log source, and log sources 204-2, . . . , 204-N can be slave log sources. The host 208 can be in communication with log management server 202. In some embodiments, each log source 204 can include a respective logging agent 205-1, 205-2, ..., 205-N (referred to generally herein as logging agents 205) deployed thereon.

The log management server 202 can be configured to receive logs from each of the log sources 204. The logging agents 205 can record logs associated with the log sources 204. The logging agents 205 can communicate (e.g., report) the logs to the log management server 202. In some embodiments, the logging agents 205 can report the logs to the log management server 202 in real time and/or in response to a request.

In some embodiments, the log management server 202 can include a combination of software and hardware, or the management server 202 can include software and can be provisioned by the processing resource 212. An example of the log management server 202 is illustrated and described in more detail with respect to FIGS. 3-6.

Figure 3:
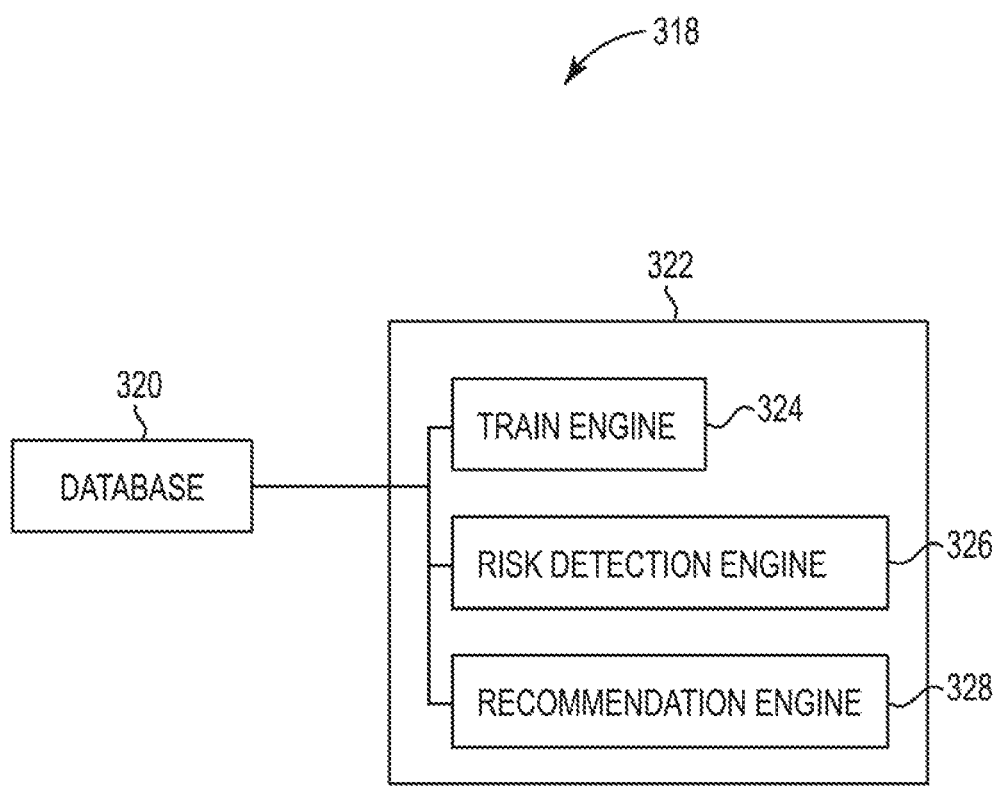
FIG. 3 is a diagram of a general logical system structure implementing early risk detection and management in an SDDC according to the present disclosure.

FIG. 3 is a diagram of a general logical system structure implementing early risk detection and management in an SDDC according to the present disclosure. For example, FIG. 3 can be a diagram of a system for early risk detection and management in an SDDC according to the present disclosure. The system 318 can include a database 320, a subsystem 322, and/or a number of engines, for example a train engine 324, a risk detection engine 326, and/or a recommendation engine 328, and can be in communication with the database 320 via a communication link. The system 318 can include additional or fewer engines than illustrated to perform the various functions described herein. The system 318 can represent program instructions and/or hardware of a machine (e.g., a computing device). As used herein, an "engine" can include program instructions and/or hardware, but at least includes hardware. Hardware is a physical component of a machine that enables it to perform a function. Examples of hardware can include a processing resource, a memory resource, a logic gate, etc.

A machine in accordance with embodiments herein can utilize software, hardware, firmware, and/or logic to perform a number of functions. The machine can be a combination of hardware and program instructions configured to perform a number of functions (e.g., actions). The hardware, for example, can include a number of processing resources and a number of memory resources, such as a machine-readable medium (MRM) or other memory resources. The memory resources can be internal and/or external to the machine (e.g., the machine can include internal memory resources and have access to external memory resources). In some embodiments, the machine can be a log management server, for example, analogous to the log management server 101 and/or 202, previously discussed in connection with FIGS. 1 and 2. The program instructions (e.g., machine-readable instructions (MRI)) can include instructions stored on the MRM to implement a particular function (e.g., an action such as determining association rules). The set of MRI can be executable by one or more of the processing resources. The memory resources can be coupled to the machine in a wired and/or wireless manner. For example, the memory resources can be an internal memory, a portable memory, a portable disk, and/or a memory associated with another resource, e.g., enabling MRI to be transferred and/or executed across a network such as the Internet. As used herein, a "module" can include program instructions and/or hardware, but at least includes program instructions.

The memory resources can be non-transitory and can include volatile and/or non-volatile memory. Volatile memory can include memory that depends upon power to store information, such as various types of dynamic random-access memory (DRAM) among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory, optical memory, and/or a solid-state drive (SSD), etc., as well as other types of machine-readable media.

The processing resources can be coupled to the memory resources via a communication path. The communication path can be local or remote to the machine. Examples of a local communication path can include an electronic bus internal to a machine, where the memory resources are in communication with the processing resources via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof. The communication path can be such that the memory resources are remote from the processing resources, such as in a network connection between the memory resources and the processing resources. That is, the communication path can be a network connection. Examples of such a network connection can include a local area network (LAN), wide area network (WAN), personal area network (PAN), and the Internet, among others.

The number of engines (e.g., 324, 326, 328) can include a combination of hardware and program instructions that are configured to perform a number of functions described herein. The program instructions (e.g., software, firmware, etc.) can be stored in a memory resource (e.g., machine-readable medium) as well as hard-wired program (e.g., logic). Hard-wired program instructions (e.g., logic) can be considered as both program instructions and hardware.

In some embodiments, the train engine 324 can include a combination of hardware and program instructions that can be configured to receive one or more log bundles associated with one or more log sources, parse the log bundle(s), and extract keywords (e.g., significant keywords). Based on the set of keywords, and the sequence of operations performed on the system, a set of association rules can be created by the train engine 324. Further details associated with the train engine 324 are discussed below in connection with FIG. 4.

In some embodiments, the risk detection engine 326 can include a combination of hardware and program instructions that can be configured to receive logs (e.g., "live" logs) associated with the log source(s), parse the logs, detect a pattern in the logs based on the association rules, and classify the pattern into one or more potential risks. The risk detection engine 326 can generate a probability to gauge the impact of the risk(s). For example, if the potential risk is a "screen of death" and the determined probability is greater than 60%, a notification (e.g., an alert message) can be provided. In some embodiments, the notification can be provided periodically (e.g., every five minutes) until a countermeasure is taken. The risk detection engine 326 can generate a summary that includes the operation(s) likely to have caused the issue(s) and the keywords in the logs. Further details associated with the risk detection engine 326 are discussed below in connection with FIG. 5.

In some embodiments, the recommendation engine 328 can include a combination of hardware and program instructions that can be configured to perform a search to gather probable solutions to the determined risks. The recommendation engine 328 can filter the solutions and determine steps associated with carrying out the solutions. In some embodiments, the recommendation engine 328 can recommend the steps associated with carrying out the solution (e.g., for manual execution). In some embodiments, the recommendation engine can execute the steps associated with carrying out the solution (e.g., automatic execution). Further details associated with the recommendation engine 328 are discussed below in connection with FIG. 6.

Figure 4:
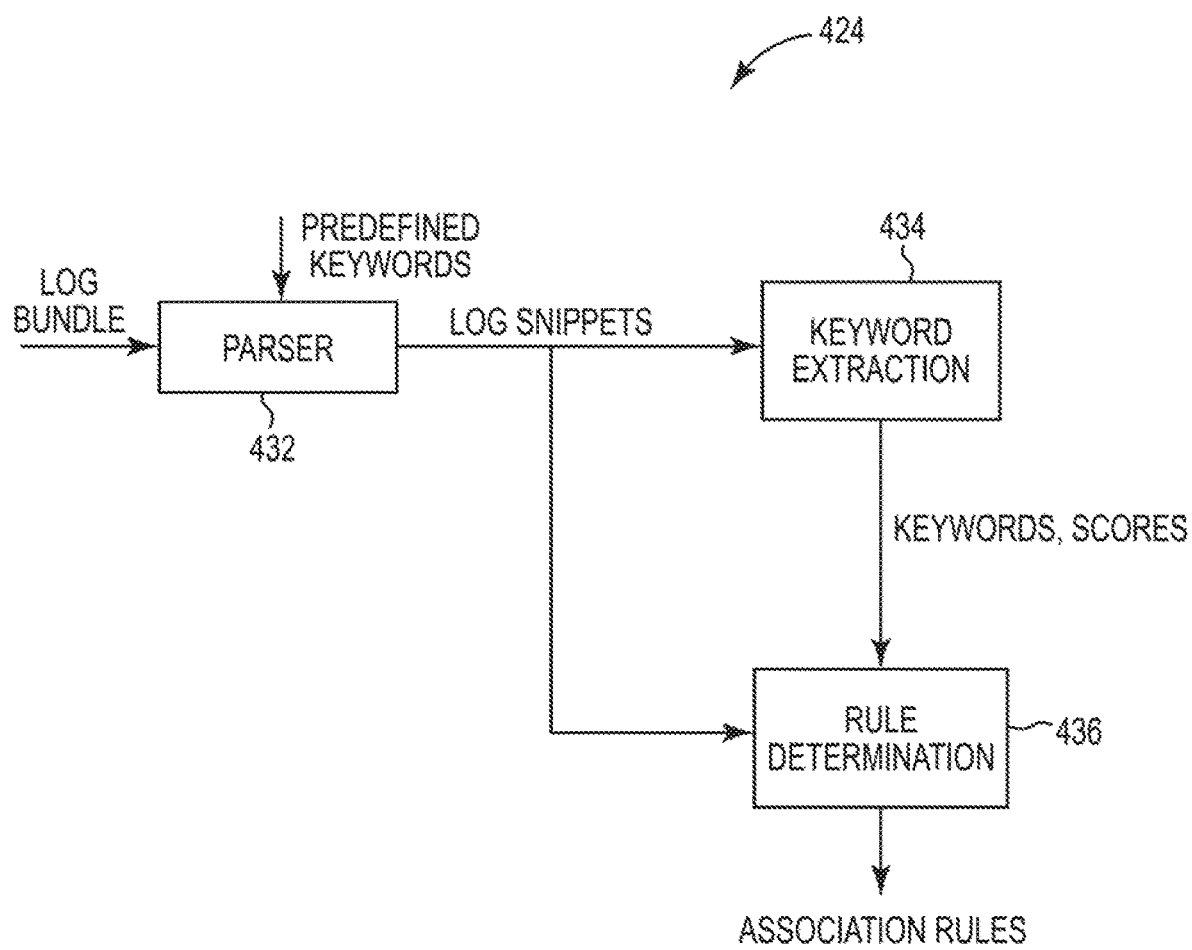
FIG. 4 illustrates a flow chart associated with the train engine of early risk detection and management in an SDDC according to the present disclosure.

FIG. 4 illustrates a flow chart 424 associated with the train engine of early risk detection and management in an SDDC according to the present disclosure. The flow chart 424 can be executed by a computing device (e.g., the log management server 101 and/or 202, previously discussed). The flow chart includes a parser 432, keyword extraction 434, and rule determination 436. The parser 432, keyword extraction 434, and rule determination 436 can be engines as described herein. In some embodiments, log bundles and predefined keywords can be received by the parser 432. A log bundle, as referred to herein, is a static dataset containing historical logs. In some embodiments, a log bundle refers to a file (e.g., a .zip file) containing historical log files. The parser 432 can request one or more log bundles from an archive (e.g., a bug archive). The parser 432 can parse the log files of the log bundle(s) to generate a task list.

Each log can include task information, which may define a number of "tasks." A task, as referred to herein, is a system activity and/or action that occurs on an object within an SDDC inventory. In some embodiments, a task can refer to a system activity that does not complete immediately. Tasks may be completed in real time. Tasks may be scheduled to occur at a later time. Tasks may be scheduled to occur on a recurring basis. In an example, a task includes migrating a virtual machine and/or powering off a virtual machine. The log parser 432 can translate the log bundles, which may be largely unstructured in some embodiments, into tasks. Task information for each task can include, for instance, an identifier associated with a task (e.g., a task ID), a beginning timestamp, and an ending timestamp.

For each task, log snippets from files associated with a time between the recorded timestamps can be collected. The resultant logs can be sorted according to timestamp and can be stored in individual files. In some embodiments, a name of each file can be designated as the corresponding task ID. The files can be tagged with one or more predefined keywords based on the presence of those predefined keywords in the files. The predefined keywords may be user-defined in some embodiments. In an example, the predefined keywords can include words such as "error," "failed," "warning," "info," "Info," and/or "problem."

Keyword extraction 434 can be executed on the files to generate a list of keywords, each associated with a respective score. In some embodiments, keyword extraction 434 can include candidate selection, property determination, and scoring and selecting keywords. Candidate selection can include extracting from the files all possible words, phrases, terms, and concepts. For example, "interrupt" can be a word, "out of memory" can be a phrase, "VmBeingRelocatedEvent" can be a term, and "SATP CX trigger mem faults" can be a concept. Property determination can include examining each candidate for one or more particular properties to determine if that candidate is a keyword. In an example, "write" may not be a keyword, but "asynchronous write failed" may be a keyword because it describes a state of an I/O operation. Scoring and selecting keywords can include determining a score that indicates a probability of a candidate being a keyword. Such keywords may be considered to be different than the predefined keywords previously discussed as the predefined keywords are user defined, in some embodiments, while the keywords are generated without user input.

In some embodiments, keyword extraction 434 can include splitting the log text into sentences and phrases using regular expressions to determine candidates, wherein punctuation rules mark sentence boundaries and stop words mark phrase boundaries. In some embodiments, keyword extraction 434 can include applying natural language processing (NLP) techniques. For instance, normalization (e.g., conversion of letters to lowercase) and/or stemming (e.g., reduction of words to root words) can be applied. $\forall x \in C$, $P(x)=freq(x)+len(x)$; where C is the set of candidates, P is the set of properties (referred to as "score") for a candidate x, freq(x) is the number of times x appears in the dataset, and len(x) is the length of x (e.g., to filter out noisy candidates). Stated differently, the minimal and maximal number of characters that a candidate contains to be considered a keyword is defined. Keywords and scores, K={<keyword, score>1, <keyword, score>2, . . . , <keyword, score>n}; where K is a set of keywords, each associated with a respective score (e.g., probability) can be received at rule determination 436.

Rule determination 436 can receive the log snippets and keywords and associated scores to generate a term frequency-inverse document frequency (tf-idf) matrix for each key word. Rule determination 436 can include the use of NLP techniques such as tokenization, stop word removal, stemming, and normalization. Tokenization can include dividing each sentence into tokens or words by removing white spaces, symbols, and special characters. Stop word removal can include removing particular words from the set of tokens such as, "is," "are," "who," "a" "an," "the," etc.

Tf-idf is considered to be a statistical measure to evaluate how significant a keyword is to a document (e.g., a portion of a log and/or log snippet) in a corpus (e.g., a log bundle). The term frequency (tf) is the ratio of the frequency of the term in the document to the total number of terms in the document. The inverse document frequency (idf) is the ratio of the total number of documents in the corpus to the number of documents that contain the term.

Based on the tf-idf matrix and the set of keywords, association rules can be determined at rule determination 436. The tf-idf matrix can be used to normalize the weight of each keywords determined at 434. These metrics, when considered together, can determine which keywords dominate the priority of operations in the formation of a sequence. Each of the association rules can include premise—sequence of operations and inference—potential risk(s). Stated differently, each association rule can comprise "if <sequence of operations>, then <probable risk(s)>."

Figure 5:
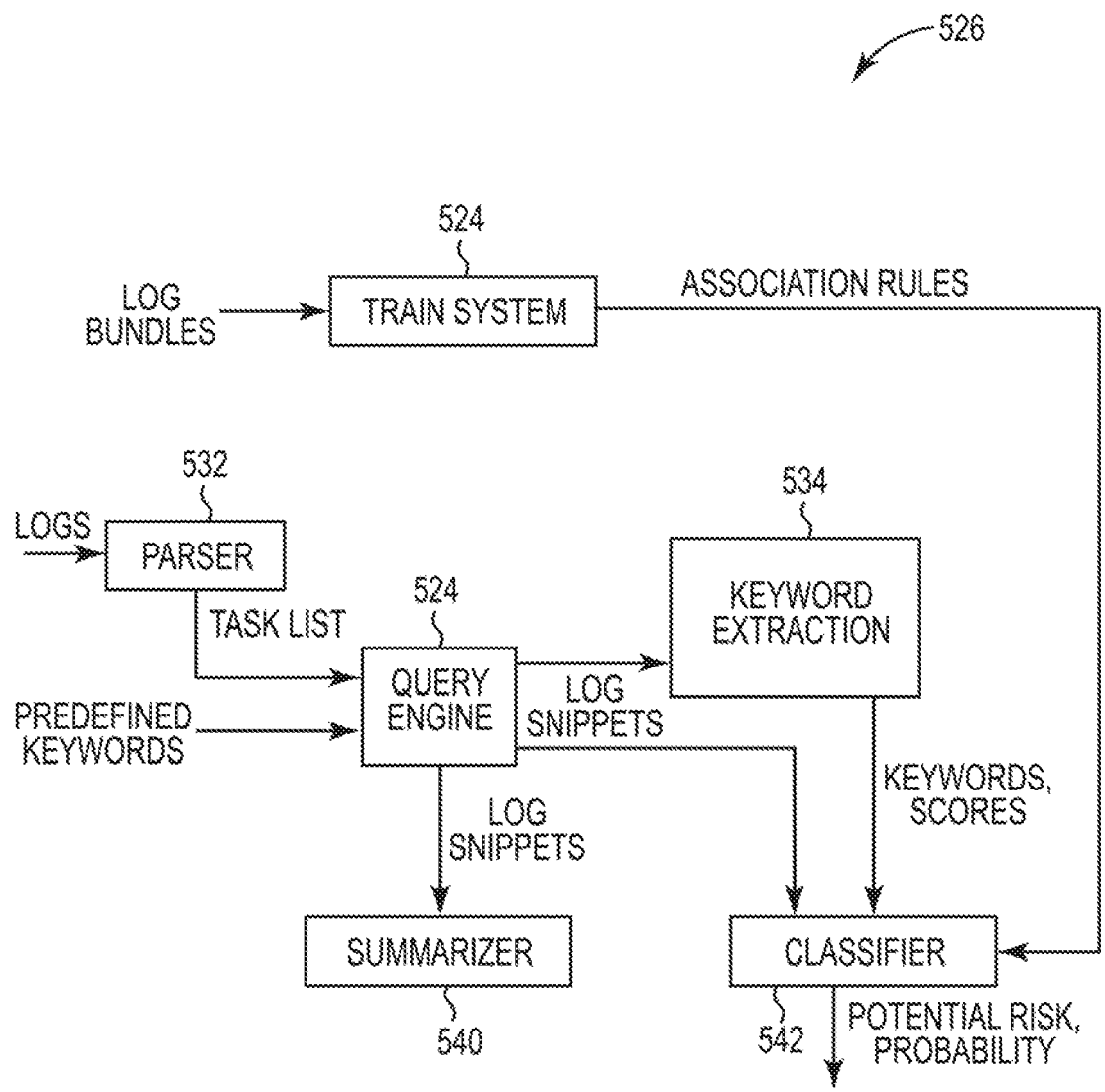
FIG. 5 illustrates a flow chart associated with the risk detection engine of early risk detection and management in an SDDC according to the present disclosure.

FIG. 5 illustrates a flow chart 526 associated with the risk detection engine of early risk detection and management in an SDDC according to the present disclosure. The flow chart 526 can be executed by a computing device (e.g., the log management server 101 and/or 202, previously discussed). The flow chart 526 includes a train system 524, keyword extraction 534, parser 532, query engine 538, summarizer 540, and classifier 542. The train system 524, keyword extraction 534, parser 532, query engine 538, summarizer 540, and classifier 542 can be engines as described herein.

The parser 532 can receive (e.g., constantly process) logs associated with log sources. As previously discussed, the parser 532 can generate a task list and store relevant log snippets into files. The query engine 538 can receive the log snippets and improve precision and/or recall of particular portions of the log snippets. The query engine 538 can communicate the log snippets to the keyword extraction 534, which can generate a list of keywords respectively associated with scores in a manner analogous to that previously discussed, for instance. The association rules, the log snippets, and the set of keywords can be received by the classifier 542. The classifier 542 can determine patterns in the logs and/or classify patterns to a set of potential risks. In some embodiments, the classifier can utilize a decision tree algorithm wherein a root of the tree is the SDDC, the operations executed in the system form the nodes of the tree, and the potential risks form the leaf nodes of the tree. The set of potential risks can include risks that are each associated with a respective probability to indicate the severity or urgency of the risk (e.g., P={<Potential Risk, Probability>1, <Potential Risk, Probability>2, <Potential Risk, Probability>n}). The probability for each of the potential risks can be determined by:

$$\{P(r): r \subseteq S_{AR_i}\} = P\left(\bigcup_n S_{AR_n}\right)$$

Where P(r) is the probability of potential risk r and $S_{AR_i}$ is the sequence of operations in the $i^{th}$ association rule. The probability of r, where r is a subset of sequence of operations in an association rule, is the product of probability of individual operations occurring in an increasing sequence. In some embodiments, order can be preserved (e.g., potential risks can be sorted in descending order of their respective probabilities). Any potential risks with a probability that does not exceed a probability threshold, k, can be ignored. In some embodiments, the probability threshold can be determined based on a type of customer of the SDDC. For example, if the customer is a financial services company, the probability threshold can be relatively low (e.g., 10%) as potential failures may be particularly costly to clients and/or partners. The summarizer 540 can receive the log snippets and determine a sequence of operations likely to have resulted in the determined risk. This sequence of operations can be provided to a user via an interface, for instance.

Figure 6:
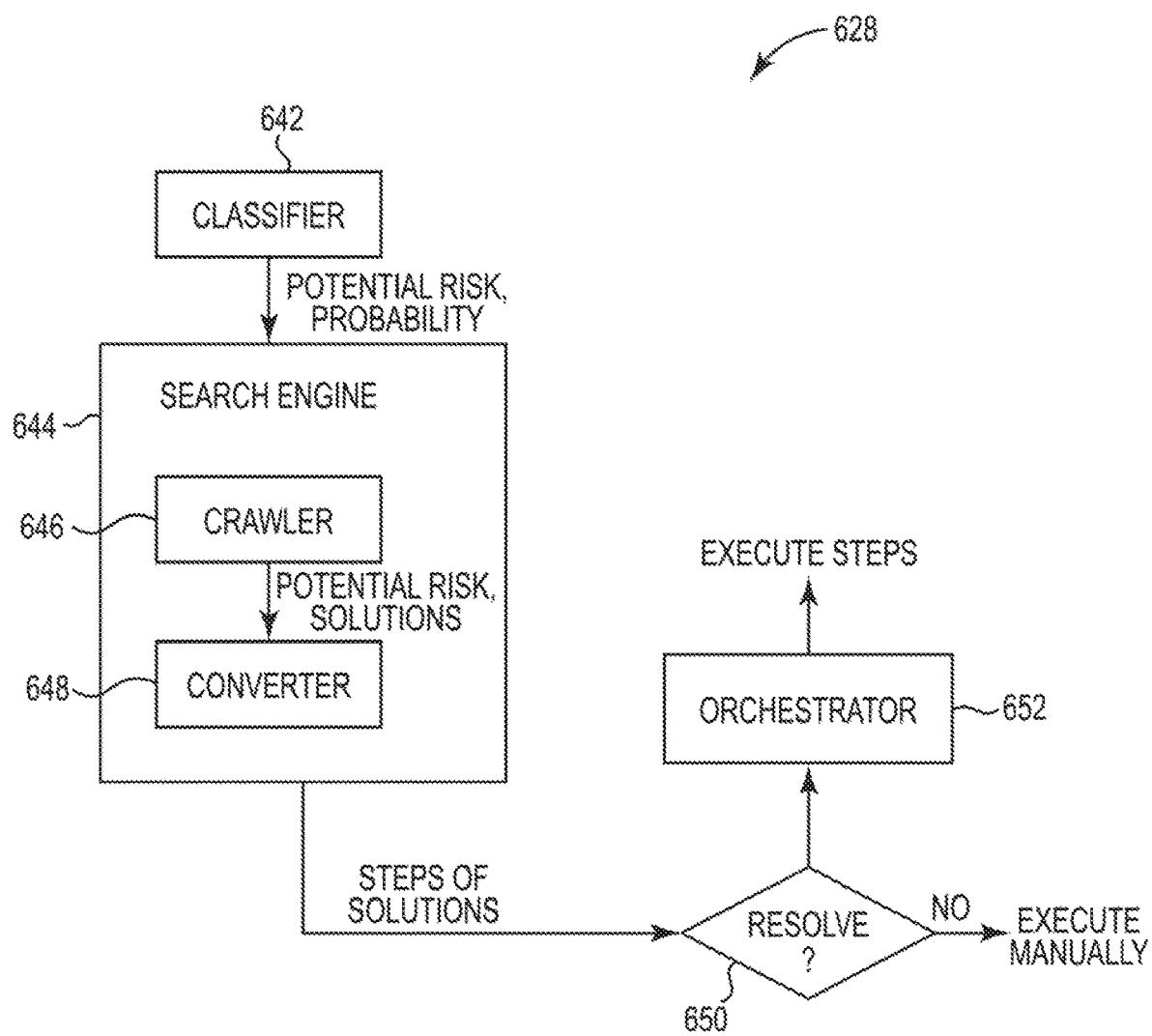
FIG. 6 illustrates a flow chart associated with the recommendation engine of early risk detection and management in an SDDC according to the present disclosure.

FIG. 6 illustrates a flow chart 628 associated with the recommendation engine of early risk detection and management in an SDDC according to the present disclosure. The flow chart 628 can be executed by a computing device (e.g., the log management server 101 and/or 202, previously discussed). The flow chart 628 includes a search engine 644 including a crawler 646 and a converter 648, and an orchestrator 652. The search engine 644 and the orchestrator 652 can be engines as described herein.

The set of potential risks, previously discussed, can be received by the search engine, which can fetch a list of probable solutions. In some embodiments, the search engine can include two modules. The crawler 646 can include a framework to crawl web sites for probable (e.g., known) solutions. In some embodiments, the crawler 646 can map each of the potential risks to a corresponding set of probable solutions. The converter 648 can generate algorithmic steps for carrying out the probable solutions. The steps can include commands, interface workflows, etc. In some embodiments, the set of probable solutions is recommended to a user via an interface. Some embodiments provide an option at 650 to either manually execute the steps of the solution or cause the computing device to execute the steps of the solution via the orchestrator 652. In some embodiments, the user can select one of a plurality of recommended solutions for execution by the orchestrator 652.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A non-transitory machine-readable medium storing instructions executable by a processing resource to cause a computing system to perform operations comprising:
receive historical logs associated with a log source of a software-defined data center (SDDC);
parse the historical logs to determine an association rule, wherein the association rule relates a particular risk to the SDDC to a sequence of operations in the historical logs;
monitor logs associated with the log source;
determine a potential risk based on an occurrence of the sequence of operations in the logs; and
provide a notification responsive to a determination that a probability associated with the potential risk exceeds a probability threshold.

2. The medium of claim 1, including instructions to provide the notification periodically until a countermeasure is taken.

3. The medium of claim 1, including instructions to include a summary in the notification that includes an indication of the sequence of operations.

4. The medium of claim 1, including instructions to perform a search for a solution associated with the potential risk.

5. The medium of claim 4, including instructions to recommend the solution in association with the notification.

6. The medium of claim 4, including instructions to execute a plurality of steps associated with the solution responsive to an input received via an interface.

7. The medium of claim 4, including instructions to execute a plurality of steps associated with the solution without user input.

8. The medium of claim 1, including instructions to request the historical logs from an archive.

9. The medium of claim 1, wherein the association rule comprises a premise and the potential risk.

10. A system, comprising:
a plurality of log sources of a software-defined data center (SDDC); and
a log management server of the SDDC that performs operations comprising:
- receive historical logs associated with each of the plurality of log sources;
- determine a plurality of keywords in the historical logs, wherein each keyword precedes, and is indicative of, a risk to the SDDC;
- determine a set of association rules based on the plurality of keywords, wherein each of the set of association rules relates a sequence of operations from the historical logs, including a portion of the plurality of keywords, to a particular risk to the SDDC;
- monitor logs associated with the plurality of log sources;
- determine a potential risk to the SDDC indicated by the logs based on the set of association rules;
- determine a solution to the potential risk; and
- execute a plurality of steps of the solution.

11. The system of claim 10, wherein the log management server:
- generates a task list comprising information describing a plurality of tasks of the historical logs;
- stores different portions of the historical logs in a plurality of files, wherein each file corresponds to a respective task of the task list;
- extracts keyword candidates from the files; and
- for each keyword candidate, determines a probability that the keyword candidate is a keyword.

12. The system of claim 10, wherein the keyword candidates include words, phrases, terms, and concepts.

13. The system of claim 10, wherein the log management server is generates a respective term frequency-inverse document frequency (tf-idf) matrix associated with each of the plurality of keywords.

14. The system of claim 13, wherein the log management server determines the set of association rules based on the plurality of keywords and the plurality of tf-idf matrices.

15. A method, comprising:
- receiving historical logs associated with each of a plurality of log sources of a software-defined data center (SDDC);
- determining a plurality of keywords in the historical logs, wherein each keyword precedes, and is indicative of, a risk to the SDDC;
- determining a set of association rules based on the plurality of keywords, wherein each of the set of association rules relates a sequence of operations from the historical logs, including a portion of the plurality of keywords, to a particular risk to the SDDC;
- monitoring logs associated with the plurality of log sources;
- determining a set of potential risks to the SDDC indicated by the logs based on the set of association rules;
- determining a subset of the set of potential risks that each exceed a probability threshold performing a search to determine a respective solution to each of the subset of potential risks; and
- executing one of the solutions.

16. The method of claim 15, wherein the method includes determining the probability threshold based on a type of customer of the SDDC.

17. The method of claim 15, wherein the method includes displaying the subset of the set of potential risks in descending order according to a respective probability of each of the subset of the set of potential risks.

18. The method of claim 15, wherein the method includes performing the search using a particular set of web sites.

19. The method of claim 15, wherein the method includes executing the one of the solutions responsive to a selection of the one of the solutions via an interface.

20. The method of claim 15, wherein executing the one of the solutions includes executing a plurality of commands made using an interface.

* * * * *